Nov. 24, 1964  G. M. KYRIAS  3,157,932
QUICK RELEASE CLAMP

Filed Aug. 7, 1963  2 Sheets-Sheet 1

INVENTOR.
GILBERT M. KYRIAS
BY
ATTORNEY
AGENT

Nov. 24, 1964

G. M. KYRIAS 3,157,932

QUICK RELEASE CLAMP

Filed Aug. 7, 1963

INVENTOR.
GILBERT M. KYRIAS

United States Patent Office 3,157,932
Patented Nov. 24, 1964

3,157,932
QUICK RELEASE CLAMP
Gilbert M. Kyrias, Littleton, Colo., assignor to the United States of America as represented by the Secretary of the Air Force
Filed Aug. 7, 1963, Ser. No. 300,711
4 Claims. (Cl. 24—271)

This invention relates to a quick release clamp for a hose.

One object of the invention is to provide a quick release clamp which will protrude from the device clamped by a lesser distance than prior art clamps.

Another object of the invention is to provide a quick release clamp which is less susceptible to damage than prior art clamps.

A further object is to provide a quick release hose clamp which is easily connected to the device being clamped.

These and other objects will be more fully understood from the following detailed description taken with the drawing wherein.

Figure 1:
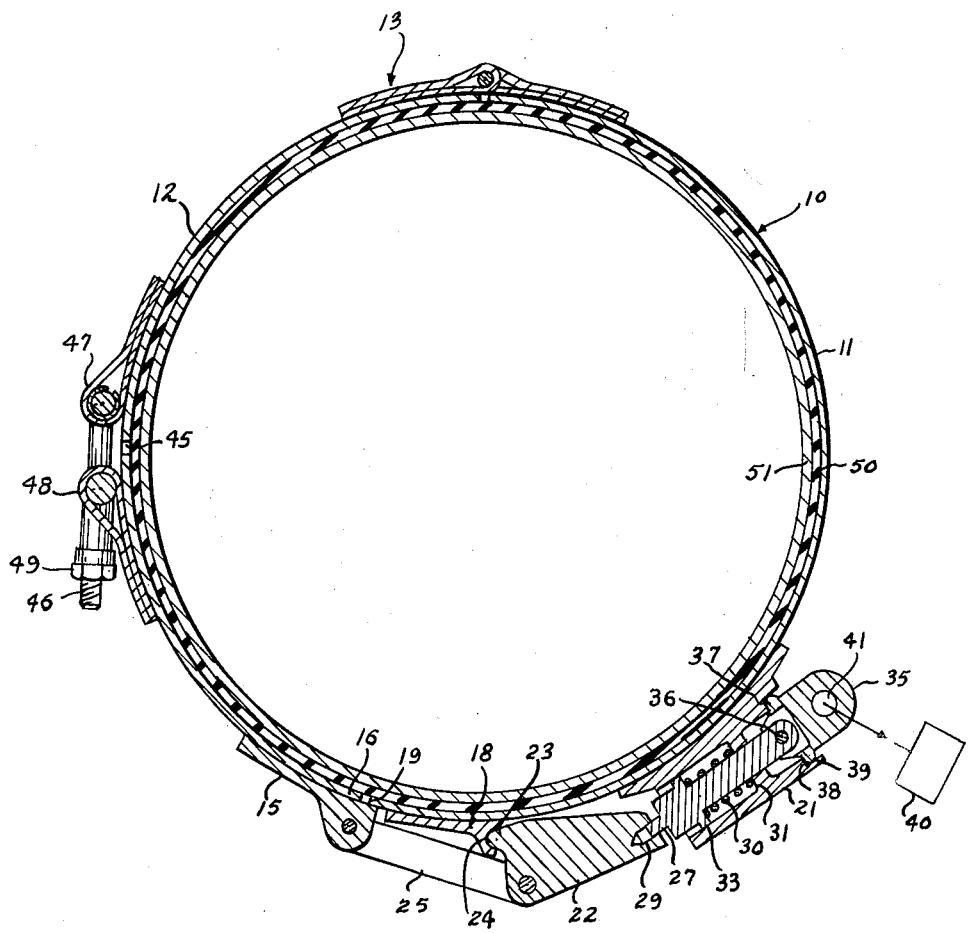
FIG. 1 shows the clamp of the invention in its clamping position.
Figure 3:
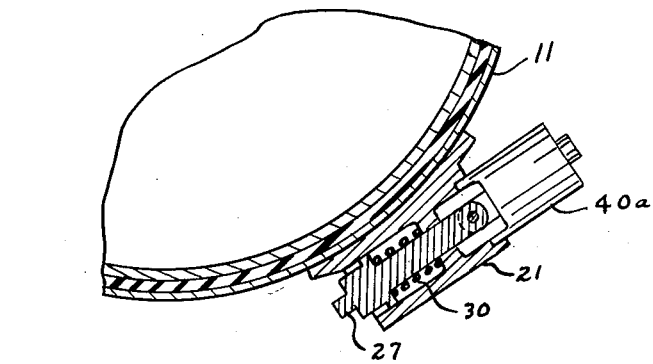

Referring now to FIG. 1 of the drawing, reference number 10 refers to a quick release clamp having two substantially semicircular clamping band members 11 and 12 interconnected by means of a hinge element 13. The band member 12 has a link fitting 15 attached to it adjacent the free end 16. The band member 11 has latch member 18 secured to it adjacent the free end 19. Also secured to band member 11 is an actuator housing 21. A toggle locking member 22 having a locking projection 23 is connected to link support 15 by means of a pivotable toggle link 25. The toggle member 22 is held in its locked position by means of a locking pin 27. The pin 27 is normally held in engagement in hole 29 in toggle 22 by means of a spring 30 located between wall 31 of housing 21 and a flange 33 on locking pin 27. A pin actuator member 35 is connected to locking pin 27 by means of a pivotable pin 36 and normally rests against walls 37 and 38 in housing 21. The play in member 35 around pin 36, though not shown, can be made great enough to permit rotation of member 35 around pivot 39. Also, a slot may be provided in member 35 if needed. A means shown schematically at 40 for applying an operating force to the releasable clamp is connected to the actuator 35 at 41. The particular operating means used forms no part of this invention; however, various means may be used such as a solenoid, a releasable spring, or an explosive squib. Also, such operating means can be connected directly to the locking pin 27 as shown in FIG. 3.

The band 12 is split at 45 and is secured by means of a tensioning bolt 46 connected between two strap members 47 and 48 secured by means of a nut 49. The tensioning bolt may be a standard band clamp T-bolt.

When the clamp 10 is used to clamp a hose 50 to a hose receiving ring member 51, bank members 11 and 12 are separated at the ends 16 and 19 by means of hinge element 13 and then are brought together around the hose 50. The nut 49 is loosened until locking projection 23 can be brought into engagement with latch member 18 and the locking pin 27 can be engaged in hole 29. The nut 49 is tightened to provide sufficient clamp tension to hold the hose 50 on the ring member 51.

Figure 2:
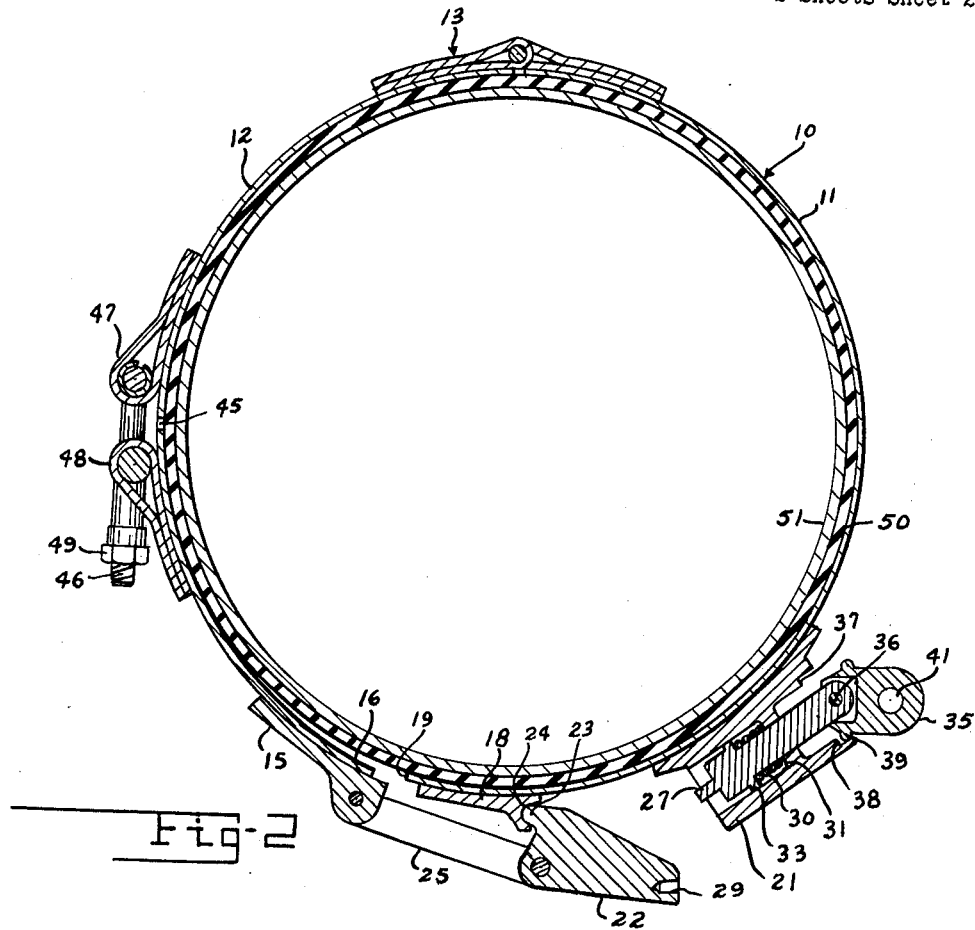
FIG. 2 shows the clamp of FIG. 1 just after the releasing force is applied; and, FIG. 3 shows a modified release mechanism for the device of FIG. 1.

To release the clamp, a force is applied to the pin actuator 35 by the force applying means 40, which causes actuator 35 to pivot around pivot 39 thus retracting locking pin 27. When the pin 27 is pulled free of hole 29 the toggle locking member 22 pivots around pivot point 24 due to the force due to clamp tension which is applied to member 22 through toggle link 25 as shown in FIG. 2. When the locking projection 23 is completely disengaged from latch member 18, the band members 11 and 12 are free to separate thus releasing the hose. The ring member 51 may be a beaded ring, though this is not shown in the drawing, so that the hose and clamp may fall free after the clamp is released. However, the construction of ring member 51 forms no part of this invention.

With the structure shown in FIG. 3, the unlocking force is applied directly to pin 27 by means of a solenoid shown in block form at 40a. After the solenoid 40a is operated to retract pin 27, the operation is the same as described above.

There is thus provided a quick release clamp for a hose which is easy to use, which is less susceptible to damage, and which does not protrude a great distance from the device clamped.

While certain specific embodiments have been described in detail, it is obvious that numerous changes may be made without departing from the general principle and scope of the invention.

I claim:

1. A quick release clamp mechanism for a hose comprising: two substantially semicircular clamping members; a hinge member interconnecting said clamping members; a latch on one of said clamping members attached to the end thereof remote from said hinge; a toggle link support member on the other of said two clamping members attached to the end remote from said hinge; a toggle mechanism having a toggle locking member and a toggle link member; said toggle link member being pivotably connected to said toggle link support member; said toggle locking member having a projection thereon adapted to be located in locking engagement with said latch; means located on said one clamping member adjacent said latch, for holding said toggle locking member in engagement with said latch in an unstable locking position; means for selectively releasing said holding means; clamp tightening means, on one of said clamping members, for providing a clamp releasing force for said clamp.

2. A quick release clamp mechanism for a hose comprising: two substantially semicircular clamping members; a hinge member interconnecting said clamping members; a latch, on one of said clamping members, attached to the end thereof remote from said hinge; a toggle link support member on the other of said two clamping members attached to the end remote from said hinge; a toggle mechanism having a toggle locking member and a toggle link member; said toggle link member being pivotably connected to said toggle link support member; said toggle locking member having a first projection thereon adapted to be located in locking engagement with said latch and a second projection; an actuator assembly located on said one clamping member adjacent said latch; said actuator assembly having a spring-loaded pin means therein for holding said toggle locking member in an unstable locking position; means for disengaging said pin means from said toggle locking member; and means on one of said clamping members for tightening said clamp mechanism around said hose to thereby provide a clamp releasing force for said clamp.

3. A quick release clamp mechanism for a hose comprising: two substantially semicircular clamping members; a hinge member interconnecting said clamping members; a latch, on one of said clamping members, attached to the end thereof remote from said hinge; a toggle link support member on the other of said two clamping members attached to the end remote from said hinge; a toggle mechanism having a toggle locking member and a toggle link member; said toggle link member being pivotably connected to said toggle link support member; said toggle locking member having a first projection thereon adapted to be located in locking engagement with said latch and a second projection thereon having a hole therein; an actuator assembly located on said one clamping member adjacent said latch; said actuator assembly having a spring-loaded pin means therein adapted to engage the hole in said toggle locking member for holding said toggle locking member in an unstable locking position; means for disengaging said pin from said hole to thereby release said clamp mechanism; and means on one of said clamping members for tightening said clamp mechanism around said hose to thereby provide a clamp releasing force for said clamp.

4. A quick release clamp mechanism for a hose comprising: two substantially semicircular clamping members; a hinge member interconnecting said clamping members; a latch on one of said clamping members, attached to the end thereof remote from said hinge; a toggle link support member on the other of said two clamping members attached to the end remote from said hinge; a toggle mechanism having a toggle locking member and a toggle link member; said toggle link member being pivotably connected to said toggle link support member; said toggle locking member having a first projection thereon adapted to be located in locking engagement with said latch and a second projection thereon having a hole therein; an actuator assembly, located on said one clamping member adjacent said latch; said actuator assembly having a spring-loaded pin means therein, adapted to engage the hole in said toggle locking member for holding said toggle locking member in an unstable locking position; a solenoid connected to said spring-loaded pin, whereby said pin may be disengaged from said toggle locking member to thereby release the clamp mechanism and means, on one of said clamping members, for tightening said clamp mechanism around said hose to thereby provide a clamp releasing force for said clamp.

References Cited in the file of this patent

UNITED STATES PATENTS

| | | |
|---|---|---|
| 962,566 | Gerth | June 28, 1910 |
| 1,564,837 | Edeborg | Dec. 8, 1925 |
| 1,598,684 | Jensen | Sept. 7, 1926 |
| 1,646,463 | Stokesberry | Oct. 25, 1927 |
| 1,654,207 | Bergonzoni | Dec. 27, 1927 |
| 1,761,409 | Pope | June 3, 1930 |
| 2,069,552 | Mikulasek | Feb. 2, 1937 |
| 2,882,071 | Klompar | Apr. 14, 1959 |
| 2,915,800 | Graef et al. | Dec. 8, 1959 |
| 2,981,187 | Riordan et al. | Apr. 25, 1961 |